Sept. 27, 1966   J. E. KASTEN   3,275,176
FORAGE WAGON CLUTCH
Filed July 6, 1964
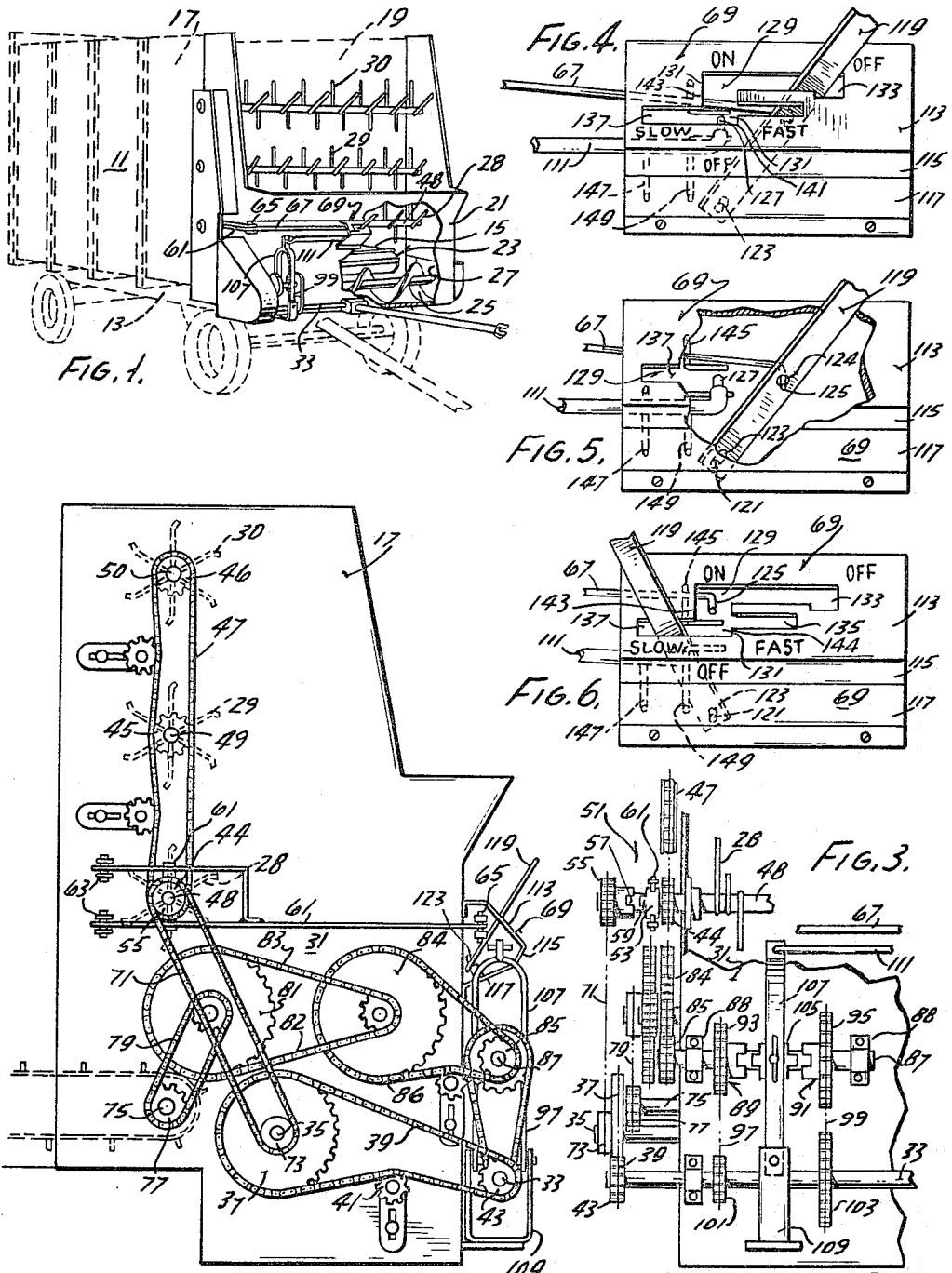
INVENTOR.
JOHN E. KASTEN
BY
Wheeler, Wheeler & Wheeler
ATTORNEYS.

United States Patent Office 3,275,176
Patented Sept. 27, 1966

3,275,176
FORAGE WAGON CLUTCH
John E. Kasten, 136 Concord Lane, West Bend, Wis.
Filed July 6, 1964, Ser. No. 380,404
9 Claims. (Cl. 214—519)

The invention relates generally to devices for coordinating and controlling operation of two activities. In addition, the invention relates generally to forage wagons. More particularly, the invention relates to such forage wagons as include an apron conveyer and one or more beaters and to controls for operating both the apron conveyer and the beaters.

The invention provides a forage wagon having clutch means controlling drive to an apron conveyer and a beater and a single lever control device capable of controlling drive, in a predetermined sequence, to both said apron conveyer and said beaters. In the disclosed construction, the control device provides for operating the apron conveyer only when the beaters are connected to the source of power for operation thereof and for assuring disconnection of the apron conveyer from the power source prior to disconnection of the beaters. In addition, the disclosed construction affords selective driving of the apron conveyer at either of two speeds. The disclosed drive mechanism also serves to power a delivery auger.

Operative connection between the beaters and the conveyer clutches and the single lever control device is by means of a pair of links which are supported, at least in part, by means on the control device housing. The links include end portions which are alignable in opposed projecting relation to each other and which are selectively receivable in an aperture or socket formed in the control lever to afford the above mentioned sequential and interdependent control. The lever is mounted on the housing by means affording lever movement in the direction parallel to the end portions so as to afford selective receipt thereof in the lever aperture and for lever movement transverse to said end portions to effect shifting of the main portions of the respective links when the associated end portions are engaged. In addition, the control device housing includes means for guiding movement of the control lever along paths designed to provide the desired lever movement. Other objects and advantages of the invention will become known by reference to the following description and the accompanying drawings in which:

FIGURE 1 is a perspective view of a forage wagon embodying various of the features of the invention;

FIGURE 2 is an enlarged fragmentary side elevational view of the drive arrangement to the power driven components of the forage wagon shown in FIGURE 1;

FIGURE 3 is an enlarged fragmentary front view of the drive arrangement shown in FIGURE 2;

FIGURE 4 is an enlarged view of the single lever control for the drive arrangement shown in FIGURES 2 and 3, the control lever being shown in the position affording disconnection of both the beaters and the apron conveyer from the power source;

FIGURE 5 is a view similar to FIGURE 4 with the cover of the control broken away; and FIGURE 6 is a view similar to FIGURE 4 showing the control lever in the position in which the beaters are drivingly connected to the power source and the apron conveyer is connected to the power source for slow speed operation.

Shown in FIGURE 1 is a forage wagon 11 comprising a wheeled support 13 which includes a deck or apron 15 and which carries side walls 17 and 19 and a front wall 21 which is at least partially open. Located on the apron 15 is a conveyer 23 which serves to advance forage from the rear to the front of the wagon. Located within a housing formed, in part, by the front wall 21 and extending transversely along the front edge of the apron 15 is an auger 25 which receives forage from the apron conveyer 23 and delivers forage through a side wall opening 27. Mounted by the side walls 17 and 19 above the front edge of the apron 15 are one or more beaters for thrashing the forage. In the disclosed construction, three beaters 28, 29, and 30 are employed.

Also carried by the wheeled support 13 is a drive arrangement or mechanism 31 for driving the apron conveyer 23, the auger 25, and the beaters 28, 29, and 30 from a power transmission shaft 33 which runs along the lower part of the front wall 21 and is adapted for connection to the power takeoff of a tractor. The drive mechanism includes means for constantly driving the auger 25 whenever the power transmission shaft 33 is rotating, clutch means for controlling the drive to the beaters 28, 29, and 30, and clutch means for controlling drive to the apron conveyer 23 and for affording apron conveyer drive at either a slow or fast rate.

More specifically, the auger drive means comprises a shaft 35 which supports the auger 25, a sprocket 37 carried on the shaft 35, and an endless member 39 which is trained around the sprocket 37 past a takeup sprocket 41 and around a sprocket 43 mounted on the end of the power transmission shaft 33.

The beater drive comprises a series of sprockets 44, 45, and 46 which are enmeshed with a common delivery belt 47 and which are respectively carried on shafts 48, 49, and 50 respectively carrying the beaters 28, 29, and 30. The sprocket 44 is driven through a clutch means 51 which is mounted on the shaft 48. The clutch means 51 comprises a dog 53 which is non-rotatably fixed on the shaft 48 but is axially movable, and a sprocket 55 which is journalled on the shaft 48 and which includes means in the form of a recess 57 engageable with a projection 59 on the dog 53 to rotatively drivingly connect the sprocket 55 to the shaft 48 when the dog 53 is shifted toward the sprocket 55. In this latter regard, the dog 53 is engaged by and is shiftable axially of the shaft 48 by a bifurcated link 61 which is pivotally supported at one end by spaced brackets 63. At its other end, the link 61 is pivotally connected by a clevis 65 to a rod 67 which can be supported by the front wall 21 and which is operated by a control device 69 still to be described.

The beater clutch sprocket 55 is drivingly engaged with an endless chain 71 which is also trained around a sprocket 73 carried by the auger shaft 35. The beater clutch sprocket 55 is thereby driven, at least in part, by a power train to the auger 25.

The apron conveyer drive comprises a shaft 75 about which the conveyer 23 is trained and which supports a sprocket 77. In turn, the sprocket 77 is drivingly connected through a chain 79 with an idler sprocket assembly 81 which, in turn, is connected by an endless chain 82 to a second idler sprocket assembly 84. This assembly is drivingly engaged through a chain 86 with a sprocket 85 carried on a cross shaft 87 journalled by bearings 88 above the power transmission shaft 33 on the front wall 21.

Carried on the cross shaft 87 are a pair of clutches 89 and 91 for controlling connection of the cross shaft 87, and therefore the apron conveyer 23, to the power transmission shaft 33 and for affording driving connection of the power transmission shaft 33 to the cross shaft 87 in either a high speed or low speed ratio.

More specifically, the clutch shaft 87 journals a pair of sprockets 93 and 95 which are respectively connected by endless chains 97 and 99 to respective drive sprockets 101 and 103 on the power transmission shaft 33. As can be readily seen, the teeth ratio between the sprockets 95 and 103 as compared to the teeth ratio between the sprockets 93 and 101 will rotate the clutch sprocket 95 at a faster rate than the clutch sprocket 93.

Non-rotatably carried but axially slidable on the cross shaft 87 is a clutch dog 105 which is engageable with socket means on each of the sprockets 93 and 95 to selectively drivingly connect the power transmission shaft 33 to the cross shaft 87. The dog 105 is selectively shiftable into engagement with the sprockets by means in the form of a bale or member 107 which is engaged with the dog and which is pivotally mounted by a bracket 109 supported by the lower part of the front wall 21. At its upper end, the bale 107 is connected to a control rod 111 which extends across the front wall to the control device 69. The control device 69 is mounted on the front wall 21 and comprises a housing in the form of a bent plate including serial portions 113, 115, and 117 which are bent with respect to each other. Mounted on the plate portion 117 by suitable means affording pivotal movement in two directions is a control level 119. In the disclosed construction, the mounting means comprises a stud 121 which extends through a relatively enlarged opening 123 at the lower end of the lever 119 and a suitable arrangement 123 such as an enlarged washer and cotter pin for preventing disconnection of the lever 119 from the stud 121.

The control lever 119 is an elongated member having intermediate its ends and within the housing a bore or aperture 124 adapted to selectively receive respectively opposed bent end portions 125 and 127 of the beater control rod 67 and the apron conveyer control rod 111.

Included in the cover plate portion 113 are means in the form of a slot 129 for controlling and guiding movement of the control lever 119. The slot 129 includes a central portion 131 and three legs 133, 135, and 137 which extend normal to the central portion 131. The upper leg 133 guides movement of the control level 119 when engaged with the bent portion 125 of the beater control rod 67 to engage and disengage the beater clutch 51, the clutch 51 being engaged when the control lever is located at the left end of the upper leg 133 and disengaged when the control lever 119 is located at the right end of the upper leg 133. The central portion 131 guides movement of the control lever 119 when disengaging one of the bent end portions and engaging the other. Thus, the lever can be disengaged from the beater control rod 67 and engaged with the apron conveyer control rod 111 only when the beater clutch 51 is engaged. When the control lever 119 is engaged with the beater control rod 67 and located in the central portion 131, the apron conveyer 23 is disengaged from the power shaft 33.

The intermediate leg 135 guides lever movement to engage and disengage the dog 105 with the sprocket 95 to drive the apron conveyer at fast speed, the dog 105 and sprocket 95 being engaged when the lever 119 is located at the right end of the leg 135. The lower leg 137 guides movement of the lever 119 to engage and disengage the dog 105 with the sprocket 93 to drive the apron conveyer 23 at slow speed, the dog 105 and sprocket 93 being engaged when the lever 119 is located at the left end of the leg 137.

From the foregoing, it will be seen that the control lever 119 can be engaged with or disengaged from the beater control rod 67 only when the beater clutch 51 is engaged. The lever can be engaged with or disengaged from the apron conveyer control rod 111 only when the apron conveyer 23 is disengaged from the power shaft 33. Thus, when the power transmission shaft 33 is rotated, the auger is driven. In addition, the beaters 28, 29, and 30 can be driven by movement of the control lever 119 from the right to the left end of the upper leg 133 of the slot 129. The apron conveyer 23 can then be operated either in fast or slow speed by engaging the bent end portion 127 of the apron conveyer control rod 111 in the aperture 124 and moving the control lever 119 either in the intermediate leg 135 or in the lower leg 137. It will be noted that the bent end portion 127 of the apron conveyer control rod can be disengaged by the lever 119 only when the apron conveyer clutch is disengaged. In this connection, the edge segment 141 of the central slot portion 131 serves to limit control lever travel to the right in the lower leg 137 and the edge segment 143 of the central portion 131 serves to limit control lever travel to the left in the intermediate leg 135. The control lever 119 is thereby more readily located in the central portion 131 than if the legs 135 and 137 formed one part of a unitarily extending leg.

The housing also includes means for supporting the adjacent ends of the control rods 67 and 111 to assure retention of the bent portions in position for re-engagement when the control lever during control lever movement is in the central slot portion 131. Such means includes a guide in the form of a bale or U-shaped member 145 which is fixed to the inside of the plate portion 113. Guide elements 147 and 149 are also provided for supporting the adjacent end of the apron conveyer control rod 111.

Various of the features of the invention are set forth in the following claims.

What is claimed is:

1. In a forage wagon, the combination of a wheeled support, a conveyer movably carried by said support, a beater rotatably carried by said support, power transmission means on said support adapted for receiving rotary power independently of the travel of the wagon, first clutch means for connecting said power transmission means for connecting said power transmission means to said conveyer, second clutch means for connecting said power transmission means to said beater, and means including a single control lever for selectively operating said second clutch between respective positions engaging and disengaging said beater with said power transmission means and, when said second clutch is in engaged position, for selectively operating said first clutch between respective positions engaging said conveyer with said power transmission means for movement at two different rates of speed.

2. In a forage wagon, the combination of a wheeled support, an apron conveyer movably carried by said support, an auger carried by said support at the delivery end of said apron conveyer, a beater rotatably carried by said support, power transmission means on said support adapted for receiving rotary power independently of the travel of the wagon, means connecting said auger to said power transmission means for driving operation of the former by the latter, first clutch means for connecting and disconnecting said power transmission means to said beater, second clutch means for connecting and disconnecting said power transmission means to said conveyor, and means including a single control lever for controlling said first clutch means and for controlling said second clutch means for selective operation of said second clutch means to afford operation of said apron conveyer at two different speeds when said first clutch means is connected.

3. In a forage wagon, the combination of a wheeled support, a conveyer movably carried by said support, a beater rotatably carried by said support, power transmission means on said support adapted for receiving rotary power, first clutch means for connecting said power transmission means to said conveyer, second clutch means for connecting said power transmission means to said beater, means on said support for supporting a pair of links having first portions in opposed alignable relation with respect to each other and second portions respectively connected to said first and second clutch means, a single control lever having therein means for singly and releasably receiving said first link portions, and means mounting said lever on said support for movement parallel to said first link portions whereby said first link portions can be selectively received in said receiving means for movement transverse to said first link portion for effecting shifting of said links to operate said clutches when the respective first link portions are engaged in said receiving means.

4. In a forage wagon, the combination of a wheeled support, an apron conveyer movably carried by said support, an auger carried by said support at the delivery end of said apron conveyer, a beater rotatably carried by said support, power transmission means on said support adapted for receiving rotary power, means connecting said auger to said power transmission means for driving operation of the former by the latter, first clutch means for connecting said power transmission means to said conveyer, second clutch means for connecting said power transmission means to said beater, a pair of links respectively connected to said first and second clutches and having respective bent end portions, a housing on said support, said housing having therein means for supporting said pair of links with said end portions disposed in alignable projecting relation toward each other, and slot means including a central portion extending in the direction of said end portions, a first leg extending from one side of said central portion, a second leg extending from said one side of said central portion, and a third leg extending from the other side of said central portion, a single control lever having therein means for singly and releasably receiving said end portions of said pair of links, and means mounting said lever on said housing for movement in said central portion of said slot means whereby said end portions can be selectively received in said receiving means and for movement in said legs for effecting shifting of the links to operate said clutches when said respective link end portions are engaged in said receiving means.

5. In a forage wagon, the combination of a wheeled support including a housing, a conveyer movably carried by said support, a beater rotatably carried by said support, power transmission means on said support adapted for receiving rotary power, first clutch means for connecting said power transmission means to said conveyer, second clutch means for connecting said power transmission means to said beater, a pair of links each having an end portion, said links being operably connected to said first and second clutch means, means on said housing for supporting said links with said end portions projecting toward each other and for movement of said links in response to movement of said end portions, and means for operably controlling said first and second clutch means including a single control lever having an aperture therein adapted for singly receiving said bent end portions, and means mounting said lever on said housing for movement parallel to said end portions, whereby said end portions can be selectively received in said aperture, and for movement parallel to said links for effecting shifting thereof when the respective end portions are engaged in said aperture, thereby to respectively control said first and second clutch members.

6. In a forage wagon, the combination of a wheeled support including a housing, a conveyer movably carried by said support, a beater rotatably carried by said support, power transmission means on said support adapted for receiving rotary power, first clutch means for connecting said power transmission means to said conveyer, second clutch means for connecting said power transmission means to said beater, a pair of links respectively operably connected to said first and second clutch means, a single control lever having means for selective connection with and disconnection from said links, means mounting said lever on said housing for link connecting and disconnecting movement and for link operating movement, thereby to respectively control said first and second clutch members, and means on said housing supporting said links for selective connecting with said single lever.

7. In a forage wagon, the combination of a wheeled support including a housing, a conveyer movably carried by said support, a beater rotatably carried by said support, power transmission means on said support adapted for receiving rotary power, first clutch means for connecting clutch means for connecting said power transmission means to said heater, a pair of links operably connected to said first and second clutch means and having free end portions, a single control lever having therein an aperture, means mounting said lever on said housing for movement affording alternative releasable receipt of said link end portions in said aperture, whereby to afford link operating movement in response to lever movement so as to respectively control said first and second clutch members, and means on said housing supporting said links for receipt of said end portions in said aperture.

8. In a forage wagon, the combination of a wheeled support including a housing, a conveyer movably carried by said support, a beater rotatably carried by said support, power transmission means on said support adapted for receiving rotary power, first clutch means for connecting said power transmission means to said conveyer, second clutch means for connecting said power transmission means to said beater, a pair of links each having an end portion, said links being operably connected to said first and second clutch means, means on said housing for supporting said links with said end portions projecting toward each other and for movement of said links in response to movement of said end portions, and means for operably controlling said first and second clutch means including a single control lever having an aperture therein adapted for singly receiving said bent end portions, and means mounting said lever on said housing for movement parallel to said end portions, whereby said end portions can be selectively received in said aperture, and for movement transverse to said end portions for effecting shifting of said links when the respective end portions are engaged in said aperture, thereby to respectively control said first and second clutch members.

9. In a forage wagon, the combination of a wheeled support, a conveyor movably carried by said support, a beater rotatably carried by said support, power transmission means on said support adapted for receiving rotary power, first clutch means for connecting said power transmission means to said conveyor, second clutch means for connecting said power transmission means to said beater, a single control lever having means affording selective operative connection with said clutch means, and means mounting said control lever for movement along a first path to selectively afford operative connection with said clutch means and for movement along paths transverse to said first path to afford respective operation of said clutch means when operatively connected with the respective clutch means.

References Cited by the Examiner

UNITED STATES PATENTS

| | | | |
|---|---|---|---|
| 1,225,873 | 5/1917 | Sharp. | |
| 2,344,317 | 3/1944 | MacDonald | 275—5 |
| 2,743,832 | 5/1956 | Kappelmann | 214—519 |
| 2,991,863 | 7/1961 | Glesmann et al. | 192—48 |
| 3,091,130 | 5/1963 | Payerle et al. | 74—471 |
| 3,095,754 | 7/1963 | Mayon et al. | 74—471 |
| 3,164,276 | 1/1965 | Bastian | 214—519 |
| 3,172,554 | 3/1965 | Fickle | 214—519 |

GERALD M. FORLENZA, *Primary Examiner.*

A. MAKAY, *Assistant Examiner.*

UNITED STATES PATENT OFFICE
CERTIFICATE OF CORRECTION

Patent No. 3,275,176 September 27, 1966

John E. Kasten

It is hereby certified that error appears in the above numbered patent requiring correction and that the said Letters Patent should read as corrected below.

Column 4, line 3, after "rod" insert -- 111 --; line 32, strike out "for connecting said power transmission means"; line 75, after "means" insert -- and --; column 6, lines 8 and 9, strike out "necting clutch means for connecting said power transmission means to said heater, a pair of links respectively" read -- necting said power transmission means to said conveyor, second clutch means for connecting said power transmission means to said beater, a pair of links respectively --.

Signed and sealed this 29th day of August 1967.

(SEAL)
Attest:

ERNEST W. SWIDER
Attesting Officer

EDWARD J. BRENNER
Commissioner of Patents